Figure 1:
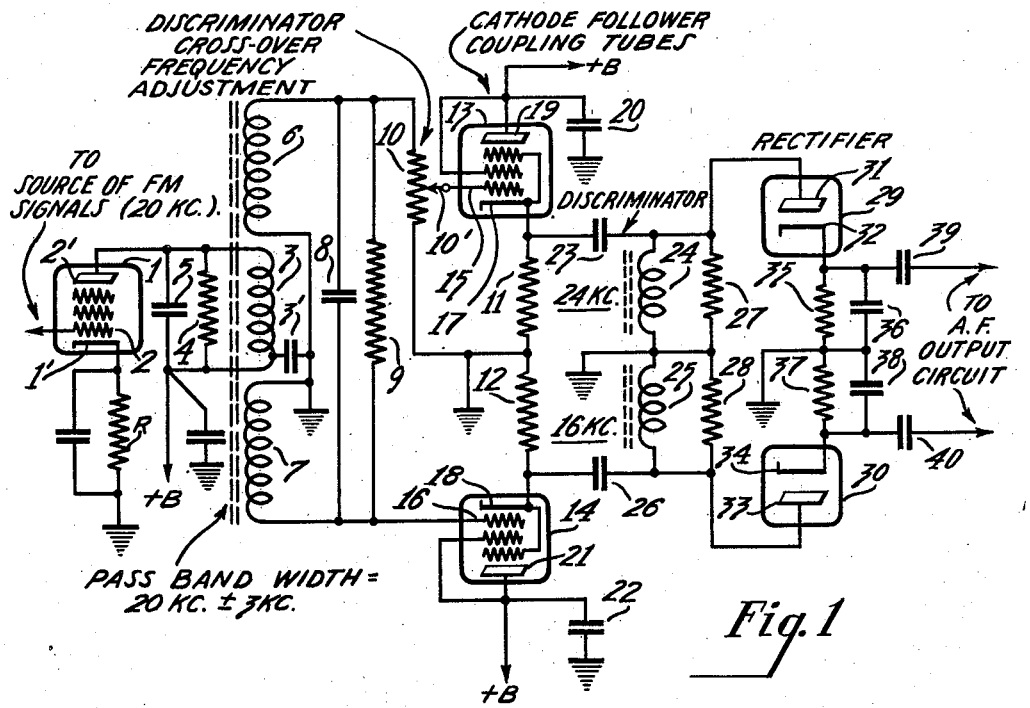

INVENTOR
John B. Atwood.

Patented Oct. 28, 1947

2,429,788

UNITED STATES PATENT OFFICE 2,429,788

ANGLE MODULATION RECEIVING CIRCUITS

John B. Atwood, Riverhead, N. Y., assignor to Radio Corporation of America, a corporation of Delaware Application June 29, 1945, Serial No. 602,271

7 Claims. (Cl. 250—27)

1

My present invention relates to novel and improved angle modulation receiving circuits, and more particularly, although not exclusively, to frequency modulation (FM) receiving circuits.

An important object of my present invention is to provide receive circuits which have advantages for low carrier frequencies, as for example those encountered in pulse FM systems; these advantages being ease of initial adjustment, decoupled resonant circuits in the discriminator, independent adjustment of the crossover frequency, and linearity in the discriminator over a wide band width in proportion to the carrier frequency.

Another object of my invention is to provide a discriminator composed of a pair of series-resonant circuits having a desired crossover, or balance, frequency, parallel signal amplifiers feeding the discriminator circuits, and the crossover frequency being adjustable without destroying the linearity of operation by varying the relative responses of the parallel amplifiers.

A more specific object of my invention is to provide a detector for FM waves whose carrier frequency is of the order of 20 kilocycles (kc.), the waves being either variable-frequency pulses or sine waves.

Still other features of my invention will best be understood by reference to the following description, taken in connection with the drawing, in which I have indicated diagrammatically a circuit organization whereby my invention may be carried into effect.

In the drawing:

Fig. 1 shows the circuit diagram of an embodiment of my invention; and

Figure 2:
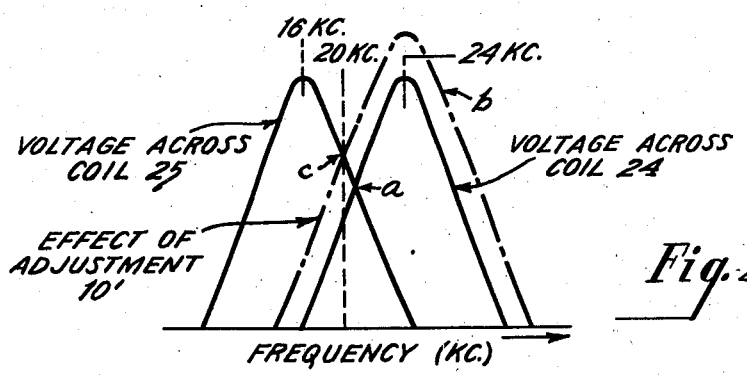

Fig. 2 graphically portrays the overlapping response curves of the coils of the discriminator circuit.

Referring now to the accompanying drawing, there is shown in Fig. 1 a specific illustration of my invention as embodied in a pulse communication receiver. Since the specific circuits preceding amplifier tube 1 are not material to an adequate understanding of my present invention, such circuits are not shown. It will be sufficient for the purposes of my present application to point out that there will be applied to control grid 2 of the amplifier tube 1 frequency-variable signals of a relatively low frequency. The generic term "angle modulated" is employed herein to include frequency modulation, phase modulation or hybrid modulations which possess characteristics common to both frequency and phase modulation.

2

While signal voltage applied to grid 2 may be either in the form of pulses or sine waves, it may be assumed in the present illustration of my invention that there is applied to grid 2 a 20 kc. pulsed carrier with a maximum deviation of ±3 kc. In other words, the carrier applied to grid 2 in its unmodulated condition has a repetition rate of 20 thousand pulses per second. This repetition rate is deviated or varied to a maximum of ±3000 cycles per second. It is to be understood that the high or radio frequency component within the pulses has been removed at a portion of the receiving system preceding grid 2 thereby leaving only relatively low frequency pulses of variable repetition rate to be applied to grid 2. The output of the transformer 3, 6, 7 will then be sine waves at a 20 kc. rate for the unmodulated condition. It will be at once appreciated that the ratio between deviation and center frequency is very high as compared to known FM systems operating at a relatively high radio frequency.

Amplifier tube 1, although shown as a pentode, may be of any other suitable type. The cathode 1' is connected to ground through a suitably bypassed cathode bias resistor R. The plate 2' is connected to the +B terminal of a suitable source of direct current (not shown) through the primary winding 3 of the output transformer. Primary winding 3 is shunted by condenser 5, and the parallel resonant circuit 3, 5 is shunted by damping resistor 4.

The primary circuit 3, 5 is fixedly tuned to the frequency of 20 kc. i. e., the center frequency of the waves applied to grid 2. The primary coil 3 is wound on an iron core along with a divided secondary winding which is made up of coils 6 and 7. The primary coil 3 is located between the grounded ends of coils 6 and 7 in order to reduce capacity coupling. The condenser 3' connects the lower end of coil 3 to the grounded ends of secondary coils 6 and 7. The secondary coils 6 and 7 are shunted by a common tuning condenser 8 and by a damping resistor 9. The parallel resonant circuit 6, 7, 8 is tuned to 20 kc. The coupled resonant circuits are adjusted to have a pass band width so that the maximum frequency deviations of the 20 kc. signal are transmitted. In other words, the pass band width of the output transformer and amplifier 1 should be at least 6 kc. It is to be clearly understood, however, that my invention is not limited to the specific 20 kc. value, nor to a deviation of ±3 kc.

The signal output of transformer 3, 6, 7 is fed in push-pull to the respective control grids 15 and 16 of amplifier tubes 13 and 14. While amplifiers 13 and 14 have been depicted as pentodes, it is to be clearly understood that they may be replaced by any other suitable types of tube. These tubes are connected to function as cathode-followers. The cathodes 17 and 18 are connected in series by resistors 11 and 12, and the junction of the two resistors is grounded. The ungrounded end of coil 6 is connected to the grounded junction of resistors 11 and 12 by potentiometer resistor 10. The slider 10' of the potentiometer resistor is connected to the control grid 15 of the tube 13. The function of the potentiometer 10, 10' is to adjust the crossover frequency of the discriminator circuit, as will be explained at a later point. The control grid 16 of tube 14 is connected to the ungrounded end of coil 7. The screen grid of each of tubes 13 and 14 is connected to its respective anode 19 and 21, and each of these anodes is connected to the +B terminal of the direct current source as indicated. Condensers 20 and 22 respectively bypass anodes 19 and 21 to ground.

The discriminator circuit does not employ coupled circuits, but rather utilizes a pair of series resonant circuits each connected respectively from the cathode of each of amplifiers 13 and 14 to ground. Thus, condenser 23 and coil 24 provide one series resonant circuit, while condenser 26 and coil 25 provide a second series resonant circuit. The junction of coils 24 and 25 is grounded. Each of coils 24 and 25 has an iron core. The resonant circuits 23, 24 and 25, 26 are each tuned to respectively different frequencies which are preferably located somewhat outside the range of frequencies to be covered by the discriminator. For example, if there is applied to grid 2 a 20 kc. carrier with a deviation of ±3 kc., then circuit 23, 24 may be resonated at 24 kc. The circuit 25, 26 may be resonated at 16 kc. by suitable adjustment of condenser 26. It will, therefore, be seen that the two series tuned circuits 23, 24 and 26, 25 are fed from the cathode resistors 11 and 12 of the cathode-follower tubes. It will, also, be noted that condensers 23 and 26 serve the double function of blocking off the direct current on the cathodes and as tuning condensers. Each of coils 24 and 25 is shunted by a respective damping resistor 27 and 28 in order to provide suitable damping. Since the discriminator is composed of a pair of series resonant circuits, the voltage across either of coils 24 and 25 will rise as the resonance frequency of its respective circuit is approached. This voltage rise is limited by the "Q" of the circuit, and since the cathode-follower tube driving the discriminator circuit presents a low impedance, the effective "Q" of the discriminator circuit is increased over that which would be obtained by feeding the circuits from a similar resistor from the plate circuit of each of tubes 13 and 14. Resistors 27 and 28 are chosen to have values to make the voltages appearing across coils 24 and 25 have the desired linear slope with frequency.

In Fig. 2 I have shown, in a purely illustrative manner, typical amplitude-frequency response curves which represent the variation of voltage across each of coils 24 and 25. It will be noted that each of the coils has a voltage peak, viz: at 16 and 24 kc. respectively. The crossover, or balance, frequency of the two response curves is located at 20 kc. When the discriminator circuits have been adjusted for a linear slope, as by choosing the magnitudes of shunt resistors 27 and 28, it may be found that the overlapping or crossover frequency falls at point $a$ which is at the wrong frequency. In accordance with my invention, the potentiometer 10, 10' can be used to adjust the amplitude of the response curve of coil 24 without destroying the linearity. Suitable adjustment of slider 10' at resistor 10 will change the response across coil 24, as suggested by the dot and dash curve $b$.

The response curve $b$ is readily secured by decreasing the magnitude of resistance between grid 15 and the ungrounded end of secondary coil 6. In other words, sufficient additional signal is applied to grid 15 to permit response curve $b$ to be secured. In effect, a new crossover frequency point $c$ is secured which falls at the desired frequency of 20 kc. Of course, the potentiometer 10, 10' may be located in the grid circuit of tube 14, if desired. In that case the response curve of tube 14 would be decreased to a point such that the crossover frequency will occur at 20 kc. The specific location of the potentiometer will be essentially a function of the "Q" of each of the series-tuned circuits, as the higher "Q" when they are properly damped, and will be generally determined by reference to a particular case. In general, then, I provide an adjustment of the relative signal transmission through the parallel amplifier channels in such a manner that the overlapping crossover frequency of the discriminator coil response curves is located at the predetermined operating center frequency of the discriminator circuit. By virtue of this construction there is provided ease of initial adjustment, and the crossover frequency of the discriminator circuit can be independently adjusted over a suitably small range. In addition, the discriminator circuit can be made linear in its response over a wide percentage band width.

The voltages developed across coils 24 and 25 respectively are separately rectified by diode rectifiers 29 and 30. The anode 31 of rectifier 29 is connected to the ungrounded end of coil 24, while anode 33 is connected to the ungrounded end of coil 25. The cathodes 32 and 34 are connected by the series-arranged load resistors 35 and 37. The load resistors 35 and 37 are respectively bypassed for the 20 kc. frequency by respective condensers 36 and 38. The junction of resistors 35 and 37 is grounded, and it will, therefore, be seen that each of coils 24 and 25 functions as the input reactance for its associated rectifier. The modulation (audio frequency) voltage is taken off through condensers 39 and 40. Of course, the voltages at the ungrounded ends of resistors 35 and 37 will have magnitudes depending upon the extent of frequency deviation of the 20 kc. carrier on grid 2 while the direction of polarity change of the rectified voltage will depend on the sense of frequency deviation. The voltages across resistors 35 and 37 may be used to drive a push-pull audio frequency amplifier in the manner well known to those skilled in the art of radio communication. The voltage across load resistors 35 and 37 will, of course, be representative of the frequency deviations of the pulses, or audio signals, at grid 2.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In combination, a source of angle modulated carrier waves, a pair of parallel amplifier channels, each channel having input terminals connected to said source, a discriminator network composed of a pair of resonant circuits respectively tuned to frequencies on opposite sides of a predetermined operating frequency by equal frequency amounts, connections between the output terminal of each amplifier channel and a respective one of said discriminator resonant circuits, means for separately rectifying voltage developed across each of the discriminator resonant circuits, and means for adjusting the relative transmission through said amplifier channels thereby to control the crossover frequency of the response characteristics of said discriminator resonant circuits.

2. In a detector of frequency modulated signals wherein a pair of series resonant circuits are respectively tuned to spaced frequencies lying on opposite sides of a predetermined center frequency, and wherein the inductive reactance of each series resonant circuit has voltage thereacross rectified; the improvement which comprises a pair of cathode follower tubes provided with a common cathode resistive impedance having a grounded mid-tap, means for feeding said series resonant circuits from the ungrounded ends of said common cathode resistor, and a variable resistor located in the input circuit of at least one of said cathode follower tubes for adjusting the crossover frequency of the overlapping response characteristics of said series resonant circuits.

3. In combination, a source of frequency modulated pulses, a pair of parallel amplifiers, each amplifier having input terminals connected to said source, a discriminator network composed of a pair of series resonant circuits tuned to respective frequencies oppositely differing from a predetermined operating frequency by equal frequency amounts, connections between an output electrode of each amplifier and a respective one of said discriminator resonant circuits, means for rectifying voltage developed across each of the discriminator resonant circuits, and means for adjusting the relative transmission through said amplifiers thereby to control the crossover frequency of the response characteristics of said discriminator resonant circuits.

4. In a detector of frequency modulated signals wherein a pair of series resonant circuits are respectively tuned to spaced frequencies lying equidistantly on opposite sides of a predetermined center frequency, and wherein a reactance of each series resonant circuit has voltage thereacross rectified; the improvement which comprises a pair of cathode follower tubes provided with a common cathode resistor having a grounded mid-tap, means for feeding said series resonant circuits from the ungrounded ends of said common cathode resistor, and a variable resistor located between the input electrodes of at least one of said cathode follower tubes for adjusting the crossover frequency of the overlapping response characteristics of said series resonant circuits.

5. In combination, a source of angle modulated carrier waves, a pair of wave transmission channels, each channel having input terminals connected to said source, a discriminator consisting of a pair of series resonant circuits respectively tuned to frequencies located on opposite sides of a predetermined operating frequency by equal frequency amounts, connections between each output terminal of each channel and a respective one of said discriminator resonant circuits, means for rectifying voltage developed across each of the discriminator resonant circuits, and variable resistor means for adjusting the relative transmission through said channels thereby to control the crossover frequency of the response characteristics of said discriminator resonant circuits.

6. In a detector of frequency modulated signals, a pair of series resonant circuits are respectively tuned to spaced frequencies lying on opposite sides of a predetermined center frequency; the improvement which comprises a pair of cathode follower tubes provided with a common cathode resistive impedance having a grounded midpoint, means for feeding said series resonant circuits from the ungrounded ends of said common cathode impedance, and a variable resistor located in the input circuit of at least one of said cathode follower tubes for adjusting the crossover frequency of the overlapping response characteristics of said series resonant circuits.

7. In combination, a discriminator network consisting of a pair of series tuned circuits respectively resonated to frequencies equally spaced from a predetermined center frequency value, a pair of electron discharge tubes of the cathode follower type, each of said tubes including at least a cathode, a signal input grid and an anode, means for applying frequency modulated signals to the respective grids of said tubes in push-pull relation, respective connections for feeding said series tuned circuits from the respective cathodes of said cathode follower tubes, means for rectifying the voltage developed across the respective inductive reactances of said series tuned circuits, and means selectively adjusting the amplitude of the signal applied to the grid of one of said tubes for the purpose of adjusting the cross-over frequency of the overlapping response characteristic of said series resonant circuits.

JOHN B. ATWOOD.

REFERENCES CITED

The following references are of record in the file of this patent:

UNITED STATES PATENTS

| Number | Name | Date |
| --- | --- | --- |
| 2,299,581 | Korman | Oct. 20, 1942 |
| 2,312,070 | Bliss | Feb. 23, 1943 |